United States Patent [19]

Reade

[11] 3,857,917

[45] Dec. 31, 1974

[54] PROCESS FOR THE PRODUCTION OF TUBULAR FILMS FROM THERMOPLASTIC MATERIALS

[75] Inventor: Grahame Melvin Reade, Wheathampstead, England

[73] Assignee: Imperial Chemical Industries Limited, London, England

[22] Filed: July 20, 1972

[21] Appl. No.: 273,430

Related U.S. Application Data

[63] Continuation-in-part of Ser. No. 45,383, June 11, 1970, abandoned.

[30] Foreign Application Priority Data

June 25, 1969  Great Britain.................... 32068/69

[52] U.S. Cl.................. 264/89, 264/95, 264/178 R, 264/209, 264/210 R, 264/290 R
[51] Int. Cl............................................ B29d 23/04
[58] Field of Search............ 264/95, 89, 209, 178 R, 264/289, 290, 210 R

[56] References Cited
UNITED STATES PATENTS

| | | | |
|---|---|---|---|
| 2,708,772 | 5/1955 | Moncrieff........................... | 264/209 |
| 2,987,767 | 6/1961 | Berry et al. ......................... | 264/209 |
| 3,142,092 | 7/1964 | Ralston............................... | 264/95 |
| 3,231,642 | 1/1966 | Goldman et al. ................... | 264/209 |
| 3,412,189 | 11/1968 | Sullivan.............................. | 264/95 |
| 3,476,846 | 11/1969 | Bottorf et al. ...................... | 264/95 |
| 3,725,519 | 4/1973 | Seifried et al....................... | 264/95 |

*Primary Examiner*—Jeffery R. Thurlow
*Attorney, Agent, or Firm*—Cushman, Darby & Cushman

[57] ABSTRACT

Process for the production of a narrow diameter tubular film by withdrawing an extruded thermoplastic tube over and in contact with a matt surfaced, tapered quenching mandrel together with a flexible seal within the tube which prevents the gas used to expand the tube bursting the tube at its point of extrusion.

7 Claims, 4 Drawing Figures

PROCESS FOR THE PRODUCTION OF TUBULAR FILMS FROM THERMOPLASTIC MATERIALS

This application is a continuation-in-part of my U.S. application Ser. No. 45,383 filed June 11, 1970, now abandoned.

The present invention relates to a process for the production from thermoplastics materials of tubular films suitable for use in the packaging of carbonated drinks, and the like. In particular, the invention relates to the product of biaxially oriented tubular films of linear, thermoplastic polyesters, especially polyethylene terephthalate.

Oriented tubular film is usually produced by extruding a relatively thick-walled thermoplastic tube from an annular orifice, and subsequently stretching the extruded tube in the transverse and/or longitudinal directions to form a thin tubular film, the stretching being effected in the transverse direction by means of internal gas pressure, and in the longitudinal direction by withdrawing the tube at an accelerated rate in the direction of extrusion. In the case of film produced from crystallisable polymers, such as polyesters, the polymer should be in a substantially amorphous state when stretched, and the extrudate must therefore be rapidly cooled, prior to reheating and stretching, to retain the polymer in the amorphous state. This cooling may be effected by any suitable method, for example by directing a cooling medium, such as water, against the external surface of the extruded tube, but in order to produce accurately dimensioned film it is desirable to shape the extruded tube before the latter is completely solidified. In the present invention, dimensioning of the tube is effected by means of a cooled mandrel located within, and in close contact with, the internal surface of the extruded tube, close contact between the mandrel and tube being essential to ensure that the resultant film is of substantially constant dimensions.

In addition to its primary function as a sizing member, the internal mandrel also assists cooling of the extruded tube, and for this latter purpose it is also essential to maintain close contact between the mandrel and tube in order to achieve the desired degree of heat transfer.

Tubular film packages for carbonated drinks and the like are conveniently of relatively narrow diameter. Although the diameter of a package will depend to some extent on the desired volume of the package, a readily handleable package will have a diameter not exceeding about 6 inches, and preferably between about 1½ and 3 inches. To produce tubular film suitable for such packages, it is necessary to employ a sizing and cooling mandrel having a maximum diameter of about 1 inch, onto which the extruded thermoplastic material is cast prior to being reheated and oriented.

I have found that it is not possible to produce tubular film of the required dimensions at a commercially acceptable rate by employing a cylindrical mandrel of the kind hitherto employed in the production of tubular polyester films, because the extruded tube tends to stick to the mandrel. Although this problem of the tube sticking to the mandrel might be eliminated by providing a sheath of lubricant between the mandrel and the tube the diameter of the mandrel is so small that the necessary conduits and ancillary equipment for the supply and removal of a lubricant cannot conveniently be accommodated within the mandrel. I have therefore found it necessary to adapt the apparatus so that sticking of the tube does not occur when an unlubricated mandrel is employed.

A further problem encountered in the production of relatively narrow tubular film is that, because for an extruded tube of a particular wall thickness the hoop stress in the tube is proportional to the product of the diameter of the tube and the pressure of gas within the tube, a comparatively high pressure of inflating gas is required to inflate the tube. This high pressure of inflating gas tends to force the extruded tube away from the mandrel, thereby enabling a high pressure of gas to accumulate within the tube in the vicinity of the orifice from which the tube is extruded. If this occurs, the tube, which is molten in the region of the extrusion orifice, will be ruptured, and it is therefore necessary to restrict the amount of inflating gas which passes back between the mandrel and tube.

Two criteria must therefore be satisfied in order to provide a satisfactory process for the production of narrow, oriented tubular film. Firstly, the tube must slide along the surface of the mandrel whilst being in sufficiently close proximity to the mandrel to ensure effective sizing and cooling of the tube. Secondly, a seal must be formed within the tube to prevent the gas pressure used to expand the tube from bursting the tube at its point of extrusion.

In order to produce oriented film it is necessary to stretch the unoriented tube between specific temperature limits which are below the melting point of the thermoplastic. The force required to stretch the cooled unoriented tube is greater than the force required to stretch the molten tube, and it is therefore necessary to prevent the forces which stretch the tube to orient it in its direction of extrusion from stretching the tube as it emerges from the extrusion die where it is molten. Thus, the speed of travel of the tube must be controlled between its point of extrusion and the zone where it is stretched to orient it.

The present invention is directed towards providing an apparatus, and process, for the production of oriented films of thermoplastic materials which satisfies the requirements set out above.

According to the present invention I provide an apparatus for the production of a tubular film from a thermoplastic material comprising an annular extrusion orifice, a sizing mandrel mounted coaxially with, and of diameter smaller than that of, the extrusion orifice, the diameter of the mandrel not exceeding 1 inch, means for internally cooling the mandrel, the mandrel having a matt surface, and being sufficiently tapered over that part of its length which is in contact with the contracting tube to accommodate the contraction of the tube as it cools to the solid state, a resilient sealing member positioned downstream of the tapered part of the mandrel for engagement with the inner surface of the tube at a point where the tube has been cooled sufficiently not to stick to the sealing member, means for withdrawing the tube over and in contact with the mandrel and sealing member at a rate greater than the rate of extrusion of the tube, means situated beyond said withdrawing means to heat the tube to its stretching temperature, means to introduce gas under pressure to within the tube at a position downstream of the sealing member, means to remove, through the core of the mandrel, excess of the pressurising gas which passes upstream of the sealing member, and means to collapse the expanded tube.

Preferably the tube is also cooled by directing a stream of cooling fluid, such as water, against the external surface of the tube as it is passing over the mandrel.

The molten tube should be withdrawn from the extrusion die onto the mandrel at a rate greater than that at which it is extruded. In this way the tube is drawn down onto the surface of the mandrel which sizes the tube to the required diameter. The amount by which the speed of travel of the tube should be increased depends upon the diameter of the tube, and the difference between the diameter of the tube and the diameter of the mandrel at the point where it is first contacted by the tube. We prefer that if the diameter of the extruded tube is about one-half inch the tube is withdrawn over the mandrel between 1.05 and 10 times preferably between 1.05 and 5 times faster than the rate at which it is extruded. If the draw ratio is less than 1.05 the tube is not drawn down sufficiently onto the mandrel and is not properly sized. If, however, the draw ratio is greater than 10 we find that the tube tends to stick to the mandrel.

The apparatus of the present invention may be used to produce uniaxially or biaxially oriented films. If uniaxially oriented material is being produced the tube should only be stretched in the direction transverse to the direction of extrusion, after the tube has been reheated to the stretching temperature. However, this invention is primarily concerned with the production of biaxially oriented films, and the tube should then be stretched both in its direction of extrusion and in the direction transverse thereto. This may conveniently be achieved by removing the expanded tube from the expansion zone with a pair of nip rolls which are driven at a greater peripheral speed than the speed at which the tube is withdrawn over the mandrel. In this way the longitudinal orientation of the tube is achieved by stretching the tube between the means which withdraws the tube over the mandrel and the rolls which collapse the expanded tube. In this way the means which withdraws the tube over the mandrel prevents the longitudinal stretching force from affecting the tube at its point of extrusion.

The apparatus of the present invention is, as hereinbefore described, particularly suitable for the production of the relatively narrow tubular film for use in the packaging of carbonated drinks, and the like. Therefore, the diameter of the sizing mandrel, which is smaller than that of the extrusion orifice, should not exceed 1 inch. The extruded molten tube is pulled down onto the mandrel by the force which withdraws the tube over the mandrel, and thus the greater the force the more the molten tube will tend to contract. The tube is cooled as it is in contact with the mandrel which should therefore be tapered at least along its length which is in contact with the shrinking tube to accommodate the shrinkage of the tube as it is being hauled over the mandrel. The amount of shrinkage that must be accommodated depends on the diameter of the tube and the rate of shrinkage depends on the rate of cooling. I have found that in order to allow a tube of initial diameter about one-half inch to slide down over the mandrel, the latter should be tapered so that the diameter decreases by at leasst 0.0008 inch per inch of the length of the tapered section of the mandrel. A taper of two thousandths of an inch for every inch of its length is particularly suitable. The length of the mandrel is not important providing it is sufficiently long to cool the tube so that the latter will not stick to the sealing member. When the tube has been fully cooled, and is completely shrunk, it will no longer contract and, assuming the tapered section of the mandrel extends beyond the point where the tube is fully cooled, the tube will part from the surface of the mandrel.

I have found that simply using a tapered mandrel is not sufficient to enable the tube to slide down over the mandrel, and it is also necessary to roughen the surface of the mandrel to prevent the tube sticking. The surface of the mandrel may be roughened in any suitable manner. For example the mandrel may be grit blasted, or sand blasted to form the rough surface. The mandrel may be coated with a particulate material to provide roughness, and this coating may be instead of or in addition to mechanical roughening of the surface. The coating which is applied may conveniently be a ceramic coating or a polymeric coating, such as polytetrafluoroethylene. If the mandrel is coated, the coated mandrel may itself have to be further abraded to give the required surface to the mandrel. The degree of mattness or roughness of a surface may conveniently be defined as showing a Centre Line Average as specified in British Standard 1134 of 1950. I have found that a mandrel having a surface roughness defined by a Centre Line Average of between 20 and 90 micro-inches is particularly suitable. If the Centre Line Average is less than 20 the tube tends to stick to the mandrel, whereas, if the Centre Line Average is greater than 90 the inside of the tube tends to be scratched.

The combination of the rough surface and the taper of the mandrel allows the tube to be drawn over the mandrel without sticking. However, I have found that the forces urging the tube onto the mandrel, which arise from the combination of the necking in of the tube due to the force withdrawing the tube over the mandrel and the thermal contraction, are not sufficient to prevent the high gas pressure which is used to expand the tube forcing the latter away from the mandrel. If this happens gas under pressure passes into the zone adjacent the extrusion die where the tube is molten. The tube is very weak at its point of extrusion where it is molten and would be burst if the relatively high gas pressure used to expand the tube was allowed to pass between the mandrel and the tube. Accordingly, I have found that it is necessary to provide a sealing member within the tube that prevents the gas under pressure passing between the tube and the mandrel.

Although the rough surface of the mandrel is intended to prevent the tube sticking to the mandrel without scratching the tube, the latter is usually abraded to some extent by contact with the rough surface so that the inner surface of the cast tube exhibits a slightly rough texture. In order, therefore, to ensure that the amount of pressurising gas passing to the upstream side of the sealing member is reduced to a minimum, I have found it necessary to employ a sealing member of a resilient or flexible material, such as rubber, which can adapt itself to the textured surface of the tube to form an adequate seal between the sealing member and tube. The sealing member, which may conveniently be a circular disc fitted to the mandrel, should be positioned towards the bottom end of the mandrel where the tube has cooled sufficiently not to stick to the sealing member. In a preferred form of the apparatus of the present invention the tapered mandrel is longer than is required to accommodate the shrinkage of the tube so that when the tube is fully shrunk it diverges from the mandrel, and the sealing member is provided at the bottom of the mandrel to fill the gap between the tube and the tapered mandrel. Conveniently the sealing member is a rubber lip seal.

It is difficult to manufacture a sealing member of the diameter and size required to make a completely effective seal, which is not so big that it will stick to the tube. This is especially true as the sealing members must last for long periods of time, and also be effective despite minor variations in tube diameter. Accordingly, in my apparatus I provide a vent to atmosphere through the core of the mandrel through which any gas which passes upstream of the sealing member may flow. If necessary a vacuum may be applied to this vent. It will be appreciated that, because of the narrow diameter of the mandrel employed in producing films in accordance with the present invention, the amount of space available within the interior of the mandrel is severely restricted. Consequently, by the time that conduits for the supply and removal of coolant for the mandrel, and for the supply of inflating gas to orient the tube, have been accommodated within the mandrel, very little space is available for venting through the mandrel core any gas which leaks back beyond the sealing member. The amount of gas which can be removed through the core of the mandrel is therefore small, and it is essential that the amount of gas leaking upstream of the sealing member is kept to a minimum. Hence, as previously described, I have found it necessary to employ a flexible or resilient sealing member which forms an effective seal with the inner surface of the tube. A rigid sealing member formed, for example, by extending the mandrel downstream beyond the pressure relief vent has been found to permit the leakage of more gas than can conveniently be removed through the narrow vent.

In a preferred embodiment of the apparatus of the present invention, means are provided for controlling the pressure within the tube adjacent the extrusion die. Conveniently there is a gap between the mandrel and the extrusion die which defines a channel which can be communicated to atmosphere. Alternatively, gas may be supplied to the interior of the tube through the channel, or a vacuum may be applied, whichever is appropriate. This pressure control system may be used as a safeguard. For example, of the molten tube is liable to burst because the internal pressure is too high, the zone adjacent the die may be vented to atmosphere or a vacuum may be applied. Alternatively, if the tube tends to stick to the mandrel, because of the high radial forces pulling the molten tube onto the mandrel, gas under pressure may be supplied to within the tube to counterbalance some of the radial forces. As mentioned above, thermoplastic materials and in particular polyethylene terephthalate are very weak when they are molten, and thus, if gas under pressure is introduced to within the tube, the pressure drop across the tube should be very small.

The means which withdraws the tube over the mandrel controls the speed of travel of the tube before it is fed to the zone in which it is stretched to orient it. As mentioned previously, the apparatus of the present invention is particularly concerned with the production of biaxially oriented film in which the tube is stretched in its direction of extrusion as well as being expanded by internal air pressure. If the tube is stretched to orient it in its direction of extusion it is essential that the stretching forces should not affect the tube as it is emerging from the extrusion die where it is molten. Accordingly, the device which hauls the tube over the mandrel also controls the speed of travel of the tube to prevent the longitudinal stretching forces from drawing off the molten tube. The most convenient method for introducing the gas which expands the tube to within the tube is to pass it through a pipe which extends through the mandrel. Generally the pipe does not pass through the device which controls the speed of the tube, and in this embodiment the device which withdraws the tube over the mandrel should not collapse the tube across its entire width but should allow gas to pass. My preferred device therefore consists either of a pair of nip rolls of width less than that of the collapsed tube which only collapse the tube at its centre. Alternatively, a pair of moving belts which grip the exterior of the tube to control its speed, but do not collapse it, may be used. If such devices are used the tube will not be creased at its edges, which is a disadvantage that occurs if the tube is collapsed over its entire width.

In addition to its function as a sizing member, the internal mandrel also assists cooling of the extruded tube, and the mandrel itself should be cooled, preferably by circulating a cooling liquid, such as water, within the mandrel. In order to speed up the cooling of the tube, the external surface of the tube is desirably cooled as it is passing over the mandrel. This cooling is suitably effected by directing a stream of cooling fluid, such as water, against the exterior surface of the tube, as for example by means of a water-bath, or overflowing weir system surrounding the tube. Desirably, in order to allow the tube to be correctly dimensioned, the externally applied cooling fluid contacts the tube at a distance at least equal to the mandrel diameter beyond the point at which the tube first contacts the mandrel. Thus, when a ½ inch diameter mandrel is employed, an external water bath is conveniently located around the tube so that the cooling water first contacts the tube at a distance of about three-fourth inch beyond the point at which the extruded tube first contacts the mandrel.

The cooled tube then passes over the sealing member and into the a heating zone where it is heated to the stretching temperature. This temperature will depend upon the nature of the material. However, in the case of polyethylene terephthalate, the temperature should be above the glass transition temperature, and below the melting point. I have found that if polyethylene terephthalate is being stretched, a temperature in the range of 85°C to 105°C may conveniently be used. The tube may be heated by any suitable means. For example it may be heated by hot air, or by passage through a circular infra-red heater which surrounds the tube.

The tube may then be stretched in the drection transverse to that in which it is extruded, by gas introduced under pressure to within the tube, and may be simultaneously stretched in its direction of extrusion by driving the means which collapses the expanded tube faster than the device which withdraws the tube over the mandrel. The amount by which the tube should be stretched depends upon the nature of the thermoplastic material, but for the production of biaxially oriented polyethylene terephthalate I prefer that the tube should be stretched between 3 times and 4½ times in both its direction of extrusion, and in the direction transverse thereto.

It will be appreciated that the amount of cooling that is necessary, and the pressure required to expand the tube will depend upon the initial thickness of the extruded tube, and the speed at which it is travelling.

This invention also provides a process for the production of oriented tubular films suitable for packaging carbonated drinks and the like. As hereinafter described, I have observed that polymeric materials having a low glass transition temperature tend to stick to the mandrel system of the present invention. Accordingly, the process of the invention comprises melt extruding a tube of an organic thermoplastic polymeric material having a glass transition temperature of at least 25°C, from an extrusion orifice, cooling and sizing the tube by withdrawing the tube over and in contact with a cooled, matt surfaced sizing mandrel at a rate greater than the speed of extrusion of the tube, the mandrel being tapered over at least that part of its length which is in contact with the contracting tube to allow for the contraction of the tube as it cools to the solid state and having a maximum diameter, not greater than 1 inch, which is smaller than that of the extrusion orifice, passing the tube over and in contact with a resilient sealing member positioned downstream of the tapered part of the mandrel, the position of the sealing member within the tube being such that the tube is sufficiently solidified not to stick when it contacts the sealing member, heating the tube to its stretching temperature, introducing gas under pressure to within the tube at a position downstream of the sealing member, removing, through the core of the mandrel, excess of the pressurising gas which passes upstream of the sealing member, and finally collapsing the expanded tube.

The tubular films produced by the process of the present invention are shrinkable, and may therefore be used in shrink wrapping applications. However, for many applications it is desirable that the shrinkage of the film at elevated temperatures should be reduced. The film may readily be rendered more dimensionally stable at elevated temperatures by holding the film under tension while it is heated. In the case of polyethylene terephthalate suitable temperatures are in the range 150°C to 230°C. This may conveniently be achieved by passing the expanded tube through a device of the type described in British Pat. No. 1,248,171. Tubular films, stabilised in this way, are particularly suitable for conversion to containers for the packaging of carbonated drinks, such as beer.

Materials suitable for use in the production of films by the techniques of the present invention include any thermoplastic, polymeric, film-forming material having a glass transition temperature of at least 25°C. The glass transition temperature is the temperature at which a polmer changes from a rubbery, flexible state to a brittle, glassy state or vice versa, and is usually identified from measurements of a particular physical property, such as specific volume, refractive index, or specific heat, as a function of temperature. I have observed that polymeric materials having a relatively low glass transition temperature, such as polyethylene and polypropylene, tend to stick to the matt-surfaced mandrel of the present invention, whereas film-forming materials having a glass transition temperature of at least 25°C, preferably at least 50°C, may be readily formed into tubular films without sticking to the mandrel. Suitable materials include polyamides, such as polyhexamethylene adipamide (Tg~50°C), linear polyesters, such as polyethylene-1,2-diphenoxyethane-4,4'-dicarboxylate (Tg ~ 62°C), and polyethylene terephthalate (Tg~70°C), polyvinyl chloride (Tg~80°C), polycarbonates (Tg~150°C), and polysulphones (Tg~230°C).

The present invention is illustrated but in no way limited by reference to the accompanying drawings in which.

Figure 1:
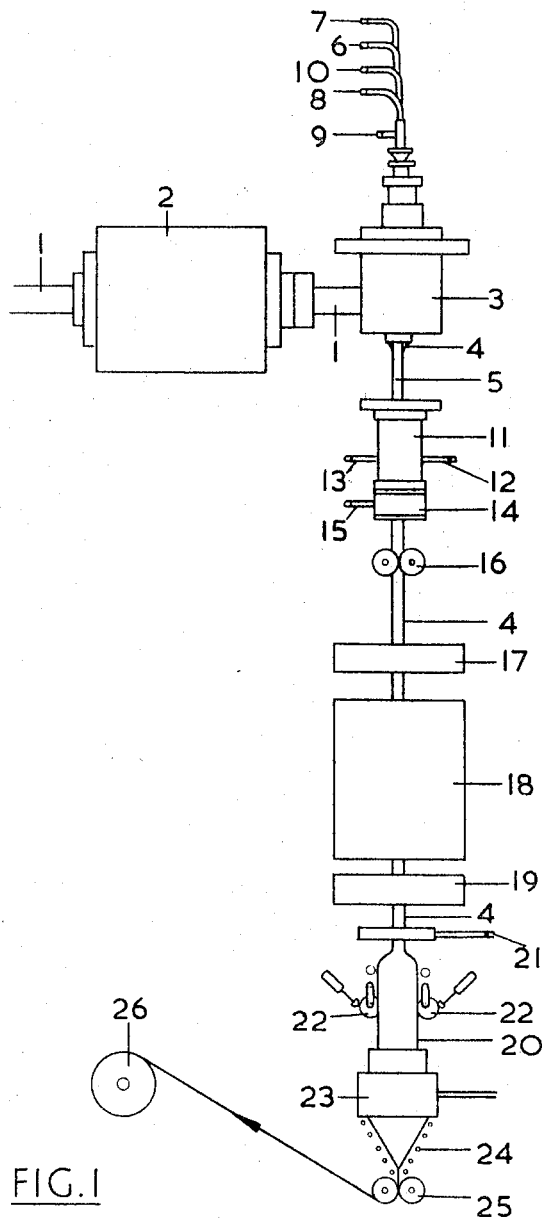
FIG. 1 is a diagrammatic illustration of an apparatus according to the present invention.

Referring to FIG. 1 which is only a diagrammatic representation of the apparatus of the present invention. The apparatus consists of an extruder 1 which forces molten thermoplastic material through a filter 2 into a cross head extrusion die 3. The extrusion die 3 has an annular extrusion orifice through which the tube 4 is extruded. A mandrel 5 passes through the centre of the extrusion die and the extruded tube is cooled by contact with the mandrel.

A pipe 6 extends throughout the length of the mandrel and through which air under pressure may be introduced to within the tube at a position beyond the mandrel. A second pipe 7 also extends through the mandrel and is used to record the pressure of air within the tube. The mandrel is cooled by circulating water through the centre of the mandrel and pipe 8 is provided for the introduction of the cooling water which flows through the mandrel and out along pipe 9. A sealing member (not shown in FIG. 1) is provided at the bottom of the mandrel and the inside of the tube is vented to atmosphere at a position just above the sealing member through pipe 10. The mandrel is tapered over the whole of its length beyond the extrusion die, and also has a roughened surface.

As well as being cooled internally the tube 4 is cooled externally by passage through a water bath 11 which surrounds the tube. Water is continually introduced into the water bath through pipe 12, and flows out through pipe 13. After passing through the water bath, the tube passes through a chamber 14 where vacuum is applied to the outside of the tube through pipe 15 to remove any water from the outside of the tube. The end of the mandrel lies within the water bath and is not therefore shown in FIG. 1.

The tube 4 is drawn over the mandrel and through the water bath by nip rolls 16 which are driven at a faster peripheral speed than the speed at which the tube is extruded. These nip rolls are of width less than the width of the collapsed tube so that they grip the tube but do not collapse it over its entire width. In this way the air under pressure which is introduced through the pipe 6 can pass the rolls 16 into the zone in which the tube is stretched to orient it.

The tube 4 then passes through a circular infrared heater 17 which surrounds the tube and rapidly heats the tube to the temperature at which it may be stretched to orient it. This rapid heating however raises the temperature of the outside of the tube more quickly than the temperature of the remainder of the tube, and so the heated tube is passed through an oven 18 where the tube temperature becomes more uniform. The tube then passes through a second ring heater 19 to ensure that the temperature of the tube is the optimum for stretching. The tube is then stretched in its direction of extrusion by the nip rolls 25 which are rotating at a greater peripheral speed than the rolls 16. The tube is also stretched in the direction transverse to its direction of extrusion by the air under pressure introduced through pipe 6.

The diameter of the expanded tube 20 is partially controlled by an air ring 21. Cold air is directed from the air ring onto the expanded tube to set the tube at the required diameter and to prevent any further expansion. Sensing devices 22 are also provided to determine if the tube is at the required diameter and this information relayed to the source supplying air under pressure through pipe 6 so that suitable adjustments may be made if necessary.

The expanded tube 20 is then cooled by passage through a cooling tube 23 where it is cooled by air at room temperature and finally collapsed by the nip rolls 25; the rolls 24 are provided to guide the tube as it is being collapsed. The flat tubular film may then be wound into a reel 26. If a film of improved dimensional stability is required the film should be held under tension while it is heated to the appropriate stabilising temperature. This may conveniently be achieved by passing the tube through a device of the type described in British Pat. No. 1,248,171 in which case the nip rolls 25 should be replaced by a pair of rolls which do not collapse the tube across it entire width, and the tube fed directly to the stabilising device.

Figure 2:
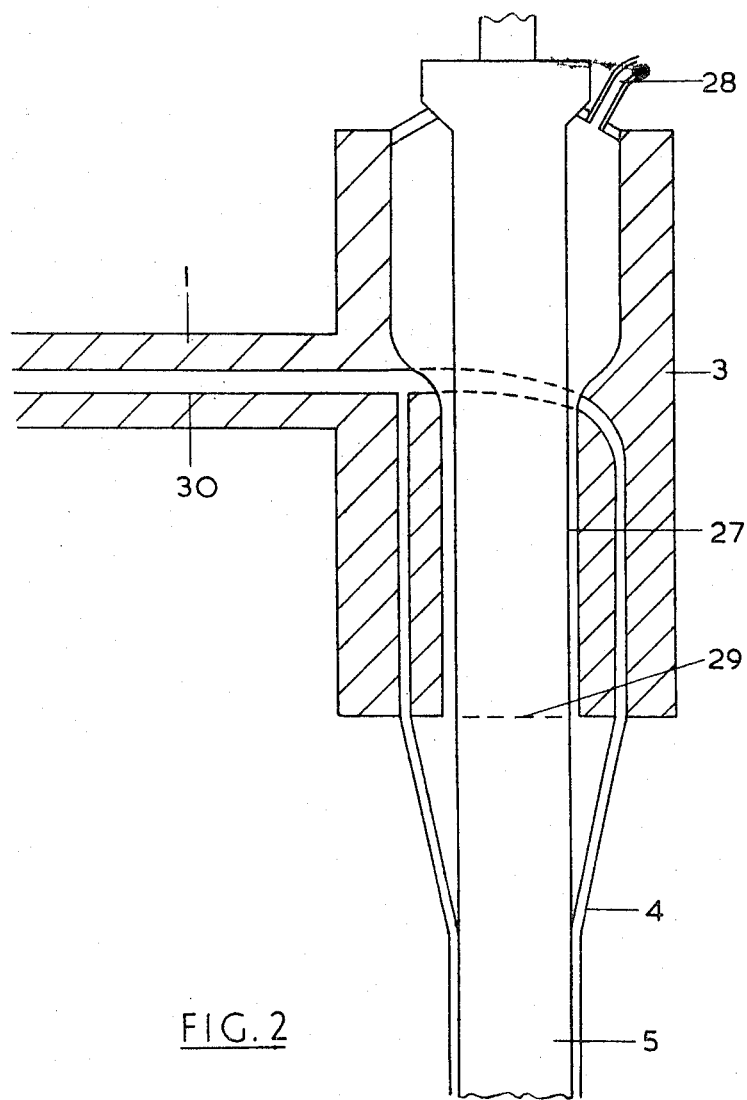
FIG. 2 is a cut away view of the extrusion die used in the apparatus of FIG. 1.

FIG. 2 is a cut away view of the extrusion die showing the die in section; the mandrel is not shown in section. FIG. 2 shows the polymer melt 30 flowing along the extruder barrel 1 into the cross head extrusion die 3. The polymer is extruded as a tube 4 which is hauled down onto the mandrel 5; the taper on the mandrel begins at the dotted line 29. As is illustrated in FIG. 2 there is a gap 27 between the mandrel 5 and the die body 3; this gap is vented to the exterior of the die body by pipe 28, and thus air under pressure, or vacuum as is appropriate, may be applied to the area between the tube 4 and the mandrel 5.

Figure 3:
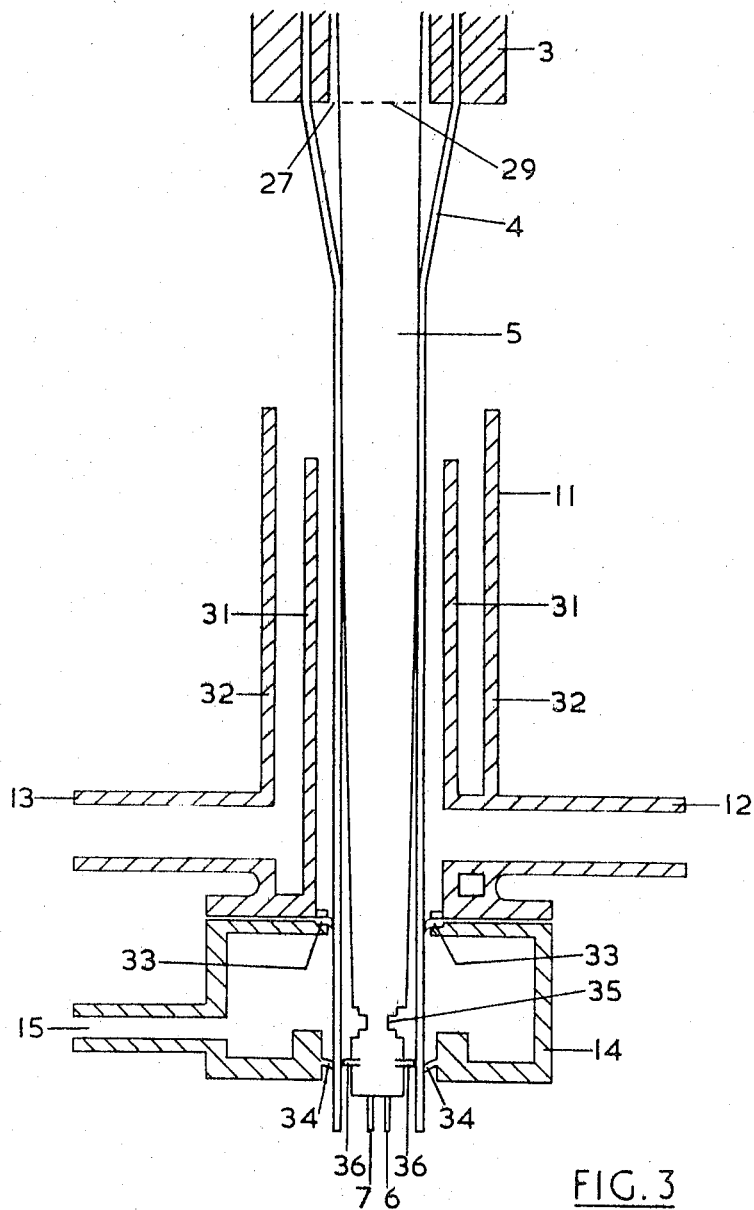
FIG. 3 is a cut away view of the mandrel and water bath quenching system used in the apparatus of FIG. 1.

FIG. 3 is a cut away view of the mandrel and water bath quenching system showing the water bath in section; the mandrel is not shown in section. As in FIG. 2 the mandrel begins to taper at the dotted line 29. Both the tube and the mandrel pass through the water bath 11 which consists of two sleeves 31 and 32 mounted coaxially around the tube. Cooling water is introduced to the water bath through pipe 12 and flows upwards along the channel between the cylinder 31 and the tube 4, over the top of cylinder 31 and downwardly along the channel between cylinders 31 and 32 and out of the water bath through pipe 13, the water bath being positioned so that the upper end of cylinder 31 is some three-fourths inch below the point at which the tube first contacts the mandrel, thereby enabling the tube to be correctly dimensioned before solidification of the tube is effected. A circular seal 33 is provided at the bottom of the water bath to prevent the water flowing down the tube. However, some water will be carried downwards by the movement of the tube and a chamber 14 is provided which surrounds the tube below the water bath. Vacuum is applied to chamber 14 through pipe 15 to remove residual water from the outside of the tube. A second circular seal 34 is provided at the bottom of chamber 14.

FIG. 3 also illustrates that the tube diverges from the mandrel when it is fully cooled and shows a circular, resilient sealing member 36 which prevents the air under pressure which is introduced through pipe 6 passing upwards between the tube and the mandrel. The mandrel is vented to atmosphere through hole 35 which is connected to atmosphere via pipe 10 which passes through the mandrel. Thus, any air passing the sealing member may be removed from within the tube through vent 35 and pipe 10.

Figure 4:
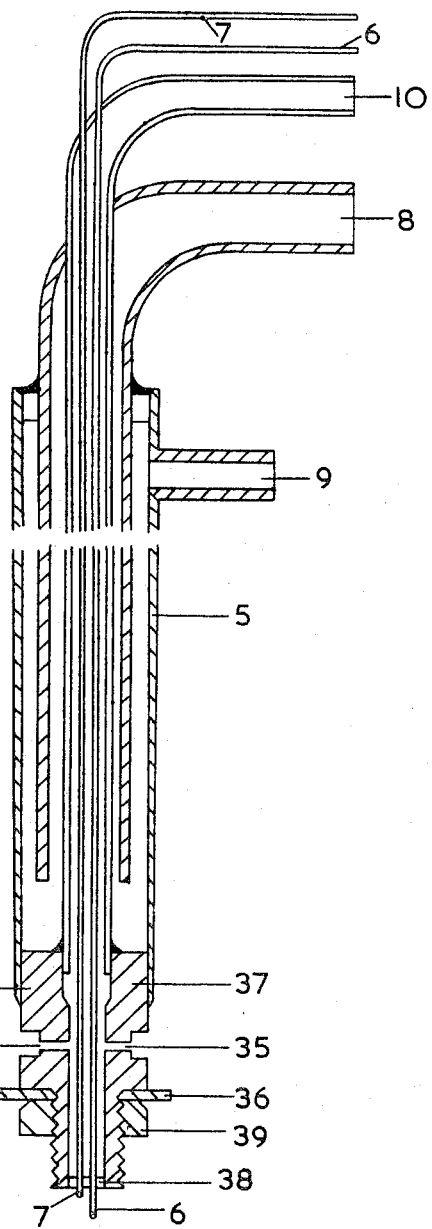
FIG. 4 is a cross section of the mandrel used in the apparatus illustrated in FIGS. 1 to 3.

FIG. 4 is a sectional view of parts of the mandrel showing the top part of the mandrel and the lower tapered part. As will be seen the mandrel is hollow and water is circulated throughout the centre of the mandrel. The water is introduced into the mandrel through pipe 8 and flows in an upward direction along the channel between pipe 8 and the walls of the mandrel 5; the water then flows out of the mandrel along pipe 9. 37 is a seal which prevents water flowing out at the bottom of the mandrel; pipe 10 passes through the seal 37 and opens into the vent 35 thus providing a communication between vent 35 and the atmosphere, pipes 6 and 7 extend within pipe 10 and pass beyond vent 35 and through the sealing member 36. 38 is a further seal which prevents air passing upwardly into the vent 35. 39 is a nut which holds the sealing member in place, and also enables the latter to be readily replaced.

The mandrel used in the apparatus illustrated in FIGS. 1 to 4 is matt surfaced.

The present invention is illustrated by the following example:

EXAMPLE

The apparatus used to produce the film was as illustrated in the accompanying drawings. The extrusion die was seven-eighths inch in diameter, the annular die gap was 0.02 inch wide, the total length of the mandrel was 27 inches and the tapered section was 11 inches long. The initial diameter of the mandrel was 0.4375 inch and it tapered regularly over 11 inches to a diameter of 0.4175 inch. The sealing member at the lower end of the mandrel has a diameter of 0.4375 inch. The mandrel had a matt surface as defined by a Centre Line Average of 63 micro inches. Cold water was circulated through the mandrel at a rate of about 14 gallons per hour and through the external water bath at a rate of 27 gallons per hour.

Polyethylene terephthalate having an intrinsic viscosity of 0.62 as measured in a 1% solution in ortho chloro phenol at 25°C was extruded from the die at 270°C and at an output of 18¾ lbs/hr. The molten tube was withdrawn from the extrusion die by nip rolls 16 which did not collapse the tube across its entire width and which were rotating at a peripheral speed of 29 feet/minute. The tube first contacted the mandrel about 2 inches below the bottom of the extrusion die, this point was one inch above the top of the water bath at which point the tube was fifteen thousandths of an inch thick.

The temperature of the tube was then raised to a temperature in the range 85°C to 95°C and stretched to orient it both in its direction of extrusion and in the direction transverse thereto. The tube was stretched in its direction of extrusion by the nip rolls 25 which were rotating at a peripheral speed of 93 ft per minute and in the direction transverse thereto by an air pressure of 8 pounds per square inch introduced to within the tube through pipe 6 this air pressure expanded the tube to a diameter of 1¾ inches. After the apparatus had been running for half an hour the surface of the mandrel was found to have a Centre Line Average of 54 micro inches, which remained substantially constant.

The final film was of 110 gauge average thickness; had a yield stress in its direction of extrusion of 13,000 pounds per square inch and of 20,000 pounds per square inch in the transverse direction. The break strength in the direction of extrusion was 25,000 p.s.i. with an 80% elongation at break and the break strength in the transverse direction was 30,000 p.s.i. with a 40% elongation at break.

I claim:

1. A process for the production of an oriented tubular film comprising downwardly melt extruding a tube of an organic thermoplastic polymeric material having a glass transition temperature of at least 25°C from an extrusion orifice, cooling and sizing the tube by withdrawing the tube over and in contact with a hollow, cooled, matt- surfaced mandrel at a rate of from 1.05 to 10 times greater than the speed of extrusion of the tube so as to stretch the tube up to 10 times in the direction of extrusion, the mandrel having a Centre Line Average surface roughness of between 20 and 90 microinches, being tapered over at least that part of its length which is in contact with the contracting tube to allow for the contraction of the tube as it cools to the solid state, the degree of taper being at least 0.0008 inch per inch of said tapered length, and having a diameter, not greater than 1 inch, which is smaller than that of the extrusion orifice, passing the tube over and in contact with a resilient sealing member in the form of a flat circular disc positioned downstream of the tapered part of the mandrel on a plug sealing the bottom of the mandrel, the position of the sealing member within the tube being such that the tube is sufficiently solidified not to stick when it contacts the sealing member, cooling the external surface of the tube with a cooling liquid, said cooling liquid contacting the tube at a distance at least equal to the mandrel diameter beyond the point at which the tube first contacts the mandrel, heating the cooled tube to its stretching temperature, introducing gas under pressure to within the tube at a position downstream of the sealing member, removing, through a vent in said plug and thence through the core of the mandrel, excess of the pressurising gas which passes upstream of the sealing member, and finally collapsing the expanded tube.

2. A process according to claim 1 in which the film is stretched longitudinally by collapsing the expanded tube at a rate greater than that at which the tube is withdrawn over the mandrel.

3. A process according to claim 1 in which the thermoplastic material is polyethylene terephthalate.

4. A process according to claim 3 in which the tube is heated to a stretching temperature of from 85° to 105°C after passing over the mandrel.

5. A process according to claim 4 in which the heated tube is stretched between 3 times and 4.5 times in both its direction of extrusion and in the direction transverse thereto.

6. A process according to claim 1 in which the thermoplastic material is a linear polyester.

7. A process as in claim 1 wherein the gas is introduced into the tube at a pressure of at least 8 pounds per square inch.

* * * * *